(No Model.)
H. N. MOSELEY.
JEWELER'S LATHE CHUCK.
No. 388,573. Patented Aug. 28, 1888.
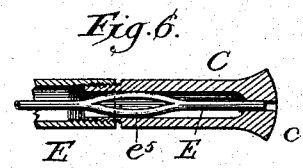
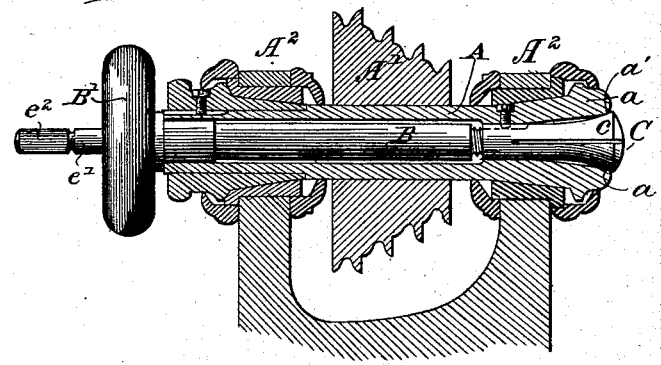
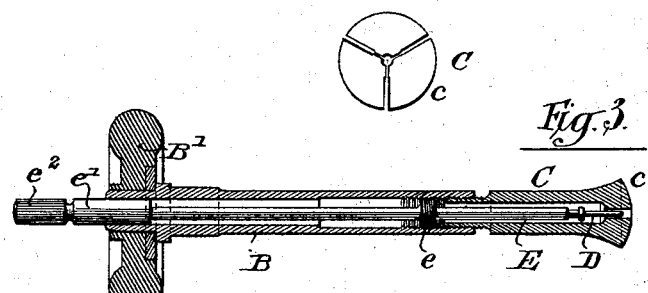
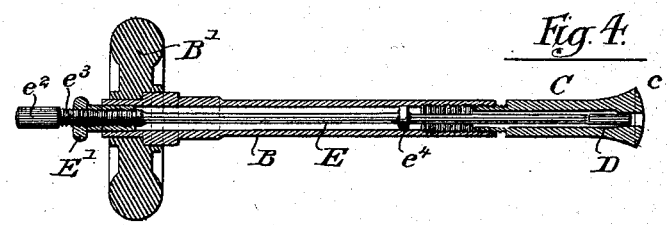
Witnesses:—
Louis M. Whitehead
C. C. Poole.
Inventor:—
Horace N. Moseley.
by:— M. E. Dayton.
Attorney:—

UNITED STATES PATENT OFFICE.

HORACE N. MOSELEY, OF ELGIN, ILLINOIS.

JEWELER'S LATHE-CHUCK.

SPECIFICATION forming part of Letters Patent No. 388,573, dated August 28, 1888.

Application filed December 14, 1885. Serial No. 185,542. (No model.)

*To all whom it may concern:*

Be it known that I, HORACE N. MOSELEY, of Elgin, in the county of Kane and State of Illinois, have invented certain new and useful Improvements in Jewelers' Lathe-Chucks; and I do hereby declare that the following is a full, clear, and exact description thereof, reference being had to the accompanying drawings, and to the letters of reference marked thereon, which form a part of this specification.

This invention relates to jewelers' lathe-chucks, and has for its object to provide an adjustable or movable bottom, stop, step, or gage within the chuck-head, whereby the distance to which objects inserted between the chuck-jaws may be conveniently and certainly regulated and determined. An adjustable stop of this character will obviously enable the length of an object to be readily gaged, or the position of a shoulder or recess determined with reference to the end surface of the object when placed in contact with the adjustable stop. The adjustable stop also will afford a convenient means of gaging the length of articles when several are to be made of the same dimensions, and said stop will be otherwise useful in many ways obvious to a skilled workman.

The invention may be more readily understood by reference to the accompanying drawings, in which—

Figure 1 is a central vertical section of a lathe provided with my improvement, and showing the chuck and spindle in side elevation. Fig. 2 is an end or face view of the chuck. Fig. 3 is a detail longitudinal section of the chuck and spindle, illustrating one construction of the adjustable stop. Fig. 4 is a view similar to Fig. 3, showing another form of the adjustable stop. Fig. 5 is a longitudinal sectional view of the chuck and the end of a spindle adjacent thereto, showing the stem which actuates the stop as provided with a screw-threaded collar engaging a screw-thread within the interior of the chuck. Fig. 6 is a similar sectional view, showing another form of the chuck, in which the stem is held in position by the spring-pressure of its parts against the walls of the hollow chuck.

As illustrated in the drawings, A is the hollow rotating arbor of the lathe provided with the usual belt-pulleys, A', and mounted in suitable bearings, A²; and B is a chuck-spindle located within the arbor A and provided with the usual hand-wheel, B'.

C is a hollow or tubular split chuck provided at its inner end with a threaded part engaged with an inwardly-threaded aperture of the spindle B, whereby the said chuck is moved longitudinally when the spindle is rotated by means of the hand-wheel, said chuck being provided with the head $c$, engaged with an aperture or seat in the arbor-head $a$, and split in the usual manner to form the jaws of the chuck.

In Figs. 3, 4, 5, and 6, D is a stop or gage located within the interior of the hollow chuck and adapted to form a bottom to the central aperture between the jaws of the chuck to control the distance to which the objects to be held therein may be inserted between the said jaws. Several different means are shown for supporting the said gage or stop and adjusting it as desired, or adjustably holding it at a desired distance from the outer or end face of the chuck. In Figs. 3 and 4 the said stop is shown as attached to a rod or stem, E, which is extended through the hollow interior of the chuck and of the spindle B, and is extended at its opposite end to a point exterior to the spindle, whereby it may be conveniently manipulated for the purpose of adjusting the stop.

In the form of the device shown in Fig. 3 the stem E is provided with an enlarged part or collar, $e$, threaded on its exterior surface to engage the threaded interior of the spindle B, whereby when the said stem is rotated it will be moved longitudinally and the stop D thereby adjusted with reference to the face of the chuck, as desired. The said stem, as shown in said Fig. 3, is desirably provided with an enlarged part, $e'$, at its outer end, by which said outer end is guided and supported in the hollow spindle B, and also with a milled head, $e^2$, whereby it may be readily turned.

In the form of the device shown in Fig. 4 a stem E is shown, which is provided at its outer end, or that adjacent to the hand-wheel B', with a threaded portion, $e^3$, adapted to engage a nut, E', held in the outer end of the hollow spindle B, preferably by frictional contact. The stem E is in this case provided with a milled head, $e^2$, whereby it may be easily rotated, and with a collar, $e^4$, having a smooth exterior surface adapted to fit into the hollow exterior of the spindle B, for the purpose of supporting and guiding the inner end of the stem, or that adjacent to the chuck.

As shown in Fig. 5, the stem E is provided with a threaded collar, $e$, as in Fig. 3, the said collar in this case being engaged with a screw-thread within the interior of the chuck C.

Instead of a screw-connection for adjustably holding the stop, the latter may be held by frictional engagement of the stem E or other support with the chuck or spindle. In Fig. 6 the stem E is shown as held in position within the chuck by frictional engagement caused by the pressure of a spring, which is conveniently formed by splitting the stem and bending outwardly the split parts of the stem, so as to form, as indicated, springs $e^5$, adapted to press outwardly against the walls of the hollow chuck.

The piece of metal shown as comprising the stop D, in the several forms of the device shown, may be formed integral with the stem E, or separate therefrom. The latter construction is shown in Figs. 4 and 5, in which the stop is shown as composed of a cylindric piece of metal provided with a tapered shank entering an aperture in the end of the stem, as shown in dotted lines in Fig. 4. The construction, in which the part forming the stop-proper is separate from the stem E, will usually be preferred, for the reason that the same size of stem may be used for chucks of different sizes, in which the stops will be made of different diameters. The stops D need not, however, fit closely within the aperture of the jaws, but may be considerably smaller than the said aperture, as shown in Fig. 3. Inasmuch as it is immaterial that the end of the stop should fit the aperture of the chuck, the metal composing the stop may be made of the same diameter for chucks of several different sizes.

My invention may obviously be carried out in a number of different ways; and I desire, therefore, that my invention be not limited to the particular construction of the means for supporting and moving said stop herein shown, except in the claims, in which said construction is specifically set forth, and desire to claim, broadly, an adjustable stop provided with a stem extending to a point exterior to the hollow spindle, by which the chuck is actuated, as set forth in the appended first claim.

The chuck C is herein shown of a novel form, being concavo-conoidal instead of conical. This particular feature is, however, not my invention, and is not herein claimed.

I claim as my invention—

1. The combination, with a hollow split chuck, C, and a hollow chuck-spindle, B, provided with a hand-wheel, of a stop, D, and a longitudinally-adjustable stem, E, attached to the stop, said stem being extended through the hollow spindle to a point exterior to the said spindle and the hand-wheel thereon, substantially as and for the purposes set forth.

2. The combination, with a hollow split chuck, C, of a stop, D, and a longitudinally movable and rotatable stem, E, attached to the stop, and having a screw-threaded part engaged with an interiorly-threaded part connected with the chuck-head, substantially as and for the purpose set forth.

3. The combination, with a hollow split chuck, C, and a hollow chuck-spindle, B, of a stop, D, a longitudinally movable and rotatable stem, E, attached to the stop, and having a guide-collar, $e^4$, and a screw-threaded portion, $e^3$, and a nut, E′, detachably secured to the outer end of the said spindle, substantially as and for the purpose set forth.

In testimony that I claim the foregoing as my invention I affix my signature in presence of two witnesses.

HORACE N. MOSELEY.

Witnesses:
M. E. DAYTON,
OLIVER E. PAGIN.